US007120583B2

(12) United States Patent
Kaneko et al.

(10) Patent No.: US 7,120,583 B2
(45) Date of Patent: Oct. 10, 2006

(54) INFORMATION PRESENTATION SYSTEM, INFORMATION PRESENTATION APPARATUS, CONTROL METHOD THEREOF AND COMPUTER READABLE MEMORY

(75) Inventors: Kazue Kaneko, Kanagawa (JP); Hideo Kuboyama, Kanagawa (JP); Shinji Hisamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 584 days.

(21) Appl. No.: 09/967,004

(22) Filed: Sep. 28, 2001

(65) Prior Publication Data

US 2002/0049599 A1 Apr. 25, 2002

(30) Foreign Application Priority Data

Oct. 2, 2000 (JP) ............................ 2000-302763
Oct. 2, 2000 (JP) ............................ 2000-302764
Oct. 2, 2000 (JP) ............................ 2000-302765

(51) Int. Cl.
*G10L 13/00* (2006.01)
*G10L 21/00* (2006.01)
*G06T 13/00* (2006.01)
*G06F 9/00* (2006.01)

(52) U.S. Cl. ...................... 704/260; 704/258; 704/270; 345/473; 715/790

(58) Field of Classification Search ................ 704/260, 704/258, 270; 345/473, 330, 335
See application file for complete search history.

(56) References Cited

U.S. PATENT DOCUMENTS 5,878,396 A 3/1999 Henton ....................... 704/276
5,946,002 A * 8/1999 Lowry ........................ 345/474
5,963,217 A 10/1999 Grayson et al. ........... 345/473
6,112,177 A 8/2000 Cosatto et al. ............. 704/260
6,324,511 B1 * 11/2001 Kiraly et al. ............... 704/260
6,390,371 B1 * 5/2002 Armga et al. .......... 235/472.01
6,424,944 B1 * 7/2002 Hikawa ...................... 704/260
6,434,525 B1 * 8/2002 Nagisa et al. .............. 704/260
6,453,294 B1 * 9/2002 Dutta et al. .............. 704/270.1
6,539,354 B1 * 3/2003 Sutton et al. .............. 704/260
6,584,479 B1 * 6/2003 Chang et al. ............... 715/512
6,983,424 B1 * 1/2006 Dutta ......................... 715/800
2001/0019330 A1 * 9/2001 Bickmore et al. .......... 345/473

FOREIGN PATENT DOCUMENTS

EP 0 896 322 A2 2/1999
EP 1 083 536 A2 3/2001

OTHER PUBLICATIONS

Bothe, Hans H., *Audio to Audio-Video Speech Conversion with the Help of Phonetic Knowledge Integration*, Oct. 12, 1997.
European Search Report, Mar. 19, 2002.
David Kurlander et al., "Comic Chat", Computer Graphics Proceedings 1996 (Siggraph); New Orleans, Aug. 4-9, 1996; New York, NY, ACM, US; pp. 225-236; XP002272622.
European Office Action dated Jul. 14, 2005.

* cited by examiner

*Primary Examiner*—David Hudspeth
*Assistant Examiner*—Matthew J Sked
(74) *Attorney, Agent, or Firm*—Morgan & Finnegan, LLP

(57) ABSTRACT

An information presentation computer receiving news articles distributed from an information distribution computer performs voice synthesis based on text information included in received send data, outputs obtained synthetic voice, and displays an animation image imitating a speaker of synthetic voice. In addition, a text to be spoken by synthetic voice is displayed in a letter color corresponding to each animation image.

13 Claims, 22 Drawing Sheets

FIG. 7

501

| GENRE NUMBER | NAME OF GENRE | CONTENTS |
|---|---|---|
| 1 | POLITICAL | HEADLINE : OPPOSITION PARTIES OPPOSING PRIME MINISTER'S ANNOUNCEMENT OF TAX REDUCTION POLICY<br>BODY : PRIME MINISTER ××× ANNOUNCED A POLICY TO ENACT "SUBSTANTIAL TAX REDUCTION" NEXT YEAR... |
| | | HEADLINE : TURNOUT OF VOTERS FOR UPPER HOUSE ELECTION EXPECTED TO GO UP.<br>BODY : FOR THE FORTHCOMING UPPER HOUSE ELECTION, UNPRECEDENTED ATTENTION FOCUSED ON THE TURNOUT... |
| | | ⋮ |
| 2 | FINANCIAL | HEADLINE : A SUDDEN FALL IN THE VALUE OF YEN IN N.Y.<br>BODY : ON THE THIRD OF THIS MONTH, THE FINAL VALUE OF THE YEN AT THE NEW YORK STOCK EXCHANGE IS... |
| | | HEADLINE : TOKYO STOCK PRICE IS CLOSING, SAGGING TO THE LEVEL OF 16000<br>BODY : INFLUENCED BY THE SUDDEN FALL IN THE VALUE OF YEN, INVESTORS OVERSEAS ARE INSECURE... |
| | | ⋮ |
| 3 | SPORTS | HEADLINE : SOCCER TEAM REPRESENTING JAPAN WON THE PRELIMINARY CONTEST FOR THE OLYMPIC GAME!<br>BODY : ON THE EIGHTEENTH OF THIS MONTH, THE SOCCER TEAM REPRESENTING JAPAN BEAT △△ BY 3 TO 1, AND WON PRELIMINARY CONTEST... |
| | | HEADLINE : AMERICAN MEN'S GOLF TOURNAMENT POSTPONED DUE TO HEAVY RAIN<br>BODY : A CHAMPIONSHIP OF THE AMERICAN GOLF TOUR SCHEDULED TO BE PLAYED TODAY... |
| | | ⋮ |
| 4 | WEATHER | LOCAL : NATIONAL<br>WHEN : THIS EVENING @@ TOMORROW @@ DAY AFTER TOMORROW<br>WEATHER : SAPPORO @@ CLOUDY WITH TEMPORAL RAIN @@ RAINY AND SUBSEQUENTLY CLOUDY @@ CLOUDY AND SUBSEQUENTLY WITH OCCASIONAL CLEARED SKY<br>WEATHER : SENDAI @@ CLOUDY @@ CLOUDY @@ CLOUDY WITH OCCASIONAL CLEARED SKY<br>WEATHER : NIIGATA @@ CLOUDY @@ CLOUDY @@ CLOUDY WITH SCATTERED RAIN<br>WEATHER : TOKYO @@ FINE AND SUBSEQUENTLY CLOUDY @@ CLOUDY AND SUBSEQUENTLY FINE @@ CLOUDY |

FIG. 9

601

< caster >
name = mainCaster
file = mainCaster.agt
color = white
< /caster >

< caster >
name = subCaster
file = subCaster.agt
color = pink
< /caster >

< caster >
name = WeatherCaster
file = WeatherCaster.agt
color = blue
< /caster >

FIG. 10

701

```
< newsgenre >
name = POLITICAL
caster = mainCaster,subCaster
< /newsgenre >

< newsgenre >
name = FINANCIAL
caster = mainCaster
< /newsgenre >

< newsgenre >
name = SPORTS
caster = SportsCaster
< /newsgenre >

< newsgenre >
name = WEATHER
caster = WeatherCaster
< /newsgenre >
```

FIG. 11

```
801 { Caster - > Show(mainCaster, position 1)
      Caster - > Show(subCaster, position 2)

802 { FrontText - > Display (OPPOSITION PARTIES OPPOSING PRIME MINISTER'S
                              ANNOUNCEMENT OF TAX REDUCTION POLICY)
      Caster - > Speak (PRIME MINISTER XXX...
                        "SUBSTANTIAL TAX REDUCTION" ..., mainCaster)
      SpokenText - > Display (PRIME MINISTER XXX...
                              "SUBSTANTIAL TAX REDUCTION" ..., white)

      .....

      FrontText - > Display (TURNOUT OF VOTERS FOR UPPER HOUSE ELECTION
                              EXPECTED TO GO UP)
      Caster - > Speak (FOR THE FORTHCOMING UPPER HOUSE ELECTION,
                        UNPRECEDENTED..., subCaster)
      SpokenText - > Display (FOR THE FORTHCOMING UPPER HOUSE ELECTION,
                              UNPRECEDENTED..., pink)
```

FIG. 14

```
Caster - > Show(mainCaster, position 1)
Caster - > Show(subCaster, position 2)


FrontText - > Display (STEEP RISE IN YEN'S VALUE IN N.Y.)
Caster - > Speak (YEN'S VALUE HAS RISEN SHARPLY AT NEW YORK STOCK EXCHANGE., mainCaster)
1101 SpokenText - > Display (YEN'S VALUE HAS RISEN SHARPLY AT NEW YORK STOCK EXCHANGE., white, position 1)
Caster - > Speak (THE YEN, RISING IN VALUE BY 1.8 YENS AGAINST THE DOLLAR COMPARED TO LATE LAST WEEK,
           IS..., subCaster)
1102 SpokenText - > Display (THE YEN, RISING IN VALUE BY 1.8 YENS AGAINST THE DOLLAR COMPARED TO LATE LAST WEEK,
           IS..., pink, position 2)
```

F I G. 17

| NAME | TYPE | DEGREE OF IMPORTANCE | IMPORTANCE POINT |
|---|---|---|---|
| WEATHER SATELLITE IMAGE | IMAGE | IMPORTANT | CENTER |
| AIRLINE SEAT AVAILABILITIES | LETTERS | IMPORTANT | CENTER |

FIG. 19

1901

AIRLINE SEAT AVAILABILITIES

AIRLINE AVAILABILITIES ARE AS FOLLOWS.
(A DESIGNATED AIRPORT WILL BE DISPLAYED IN PINK)

SALES DATE : SEP. 11 DEPARTURE : TOKYO (HANEDA AIRPORT)
DESTINATION : SAPPORO (CHITOSE AIRPORT)

○ : SEATS UNOCCUPIED △ : FEW SEATS UNOCCUPIED
× : ALL THE SEATS OCCUPIED
— : UNDEFINED, PRESALE OR COMPLETION OF SALE

DEPARTURE (TIME) DESTINATION (TIME) FLIGHT SUPER SEAT

1. TOKYO (HANEDA)(06:55)—SAPPORO(CHITOSE)(08:25)ANA053△△○—○————
2. TOKYO (HANEDA)(07:55)—SAPPORO(CHITOSE)(09:25)ANA055△△○—○————
3. TOKYO (HANEDA)(08:50)—SAPPORO(CHITOSE)(10:20)ANA057 1 1 △—△————
4. TOKYO (HANEDA)(10:00)—SAPPORO(CHITOSE)(11:30)ANA059 1 1 ×—×————
5. TOKYO (HANEDA)(11:00)—SAPPORO(CHITOSE)(12:30)ANA061△××—×————
6. TOKYO (HANEDA)(13:00)—SAPPORO(CHITOSE)(14:30)ANA063△△○—○————
7. TOKYO (HANEDA)(14:00)—SAPPORO(CHITOSE)(15:30)ANA065△△○—○————

INFORMATION PRESENTATION SYSTEM, INFORMATION PRESENTATION APPARATUS, CONTROL METHOD THEREOF AND COMPUTER READABLE MEMORY

FIELD OF THE INVENTION

The present invention relates to a an information presentation system and information presentation apparatus configured in such a manner that an information distribution terminal is connected via a network to an information presentation terminal presenting information distributed from the information distribution terminal, a control method therefor and a computer readable memory.

BACKGROUND OF THE INVENTION

Various methods for informing flow information such as ever-changing fresh news articles to users have been proposed. Among them, for example, news programs on television and radio are one of the oldest and prevalent information presenting methods.

In these news programs, a news caster reads out a manuscript to convey information to users. Information is conveyed by voice, thus making it possible for a user to hear information while carrying out cleaning or driving a car, for example, and the need for monopolizing attention from the user all the time thus is eliminated. Also, in television, visuals are used to provide information more effectively.

On the other hand, communication technologies such as computers and Internet have been developed, and new information presenting methods such as home pages describing the latest news and services for distributing news through e-mails have been proposed. These information presenting methods have features missing in television and radio in the sense that they have on-demand natures allowing information to be provided whenever it is needed, and interactive natures enabling a user to indicate desired information by news genre and the like, not just receiving information one-sidedly. Also, since static images and moving images can be treated, it is possible to provide information more effectively by appealing to visual.

However, news programs on television and radio lack on-demand natures allowing information to be provided whenever it is needed, and interactive natures allowing an audience to indicate desired information in accordance with a news genre and the like, because their broadcast time is fixed and the order of the contents of news to be conveyed is fixed by a broadcasting station.

On the other hand, supply of news by homepages describing news articles, services of news articles through e-mails, and so on leads to a high barrier for people who cannot operate personal computers well. Also, since information is supplied only by texts, a user should “read” the information by paying attention to the screen all the time for receiving the information, leading to lack of convenience of receiving information while for example carrying out cleaning or driving a car at the same time.

SUMMARY OF THE INVENTION

An object of the present invention is to provide an information presentation system and information presentation apparatus capable of providing more effective presentation of information, a control method thereof and a computer readable memory.

According to the present invention, the foregoing object is attained by providing an information presentation system comprising a sending apparatus sending send data including text information, and a receiving apparatus is connected to the sending apparatus in being capable of communication and receives the send data, wherein the receiving apparatus comprises: voice outputting means for carrying out voice synthesis based on text information included in received send data, and outputting obtained synthetic voice; first displaying means for displaying speaker images imitating speakers of the synthetic voice; and second displaying means for displaying a text string to be spoken by the synthetic voice in a text display form corresponding to each of the speaker images.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 shows news articles arranged by genre in First Embodiment of the present invention;

FIG. 9 shows an example of files for defining virtual casters of First Embodiment of the present invention;

FIG. 10 shows an example of files for defining each news genre of First Embodiment of the present invention;

FIG. 11 shows an example of generating an operation description language in First Embodiment of the present invention;

FIG. 14 shows another example of generating an operation description language in First Embodiment of the present invention;

FIG. 17 shows an example of a structure of data that is managed when letter information and image information are emphasized in Second Embodiment of the present invention;

FIG. 19 shows another example of displaying screens in Second Embodiment of the present invention;

DETAILED DESCRIPTION OF THE PREFERRED EMBODIMENTS

Figure 1:
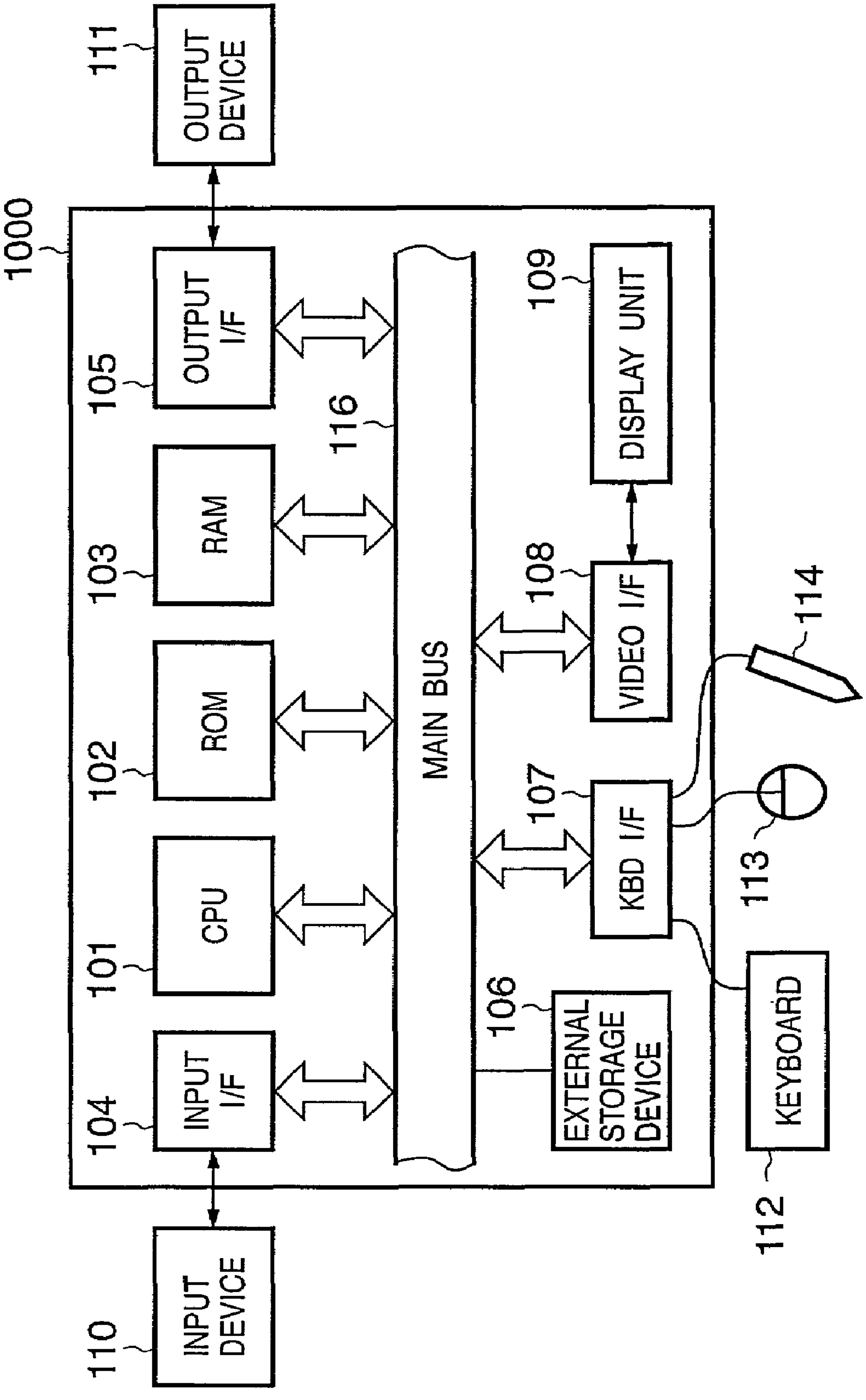
FIG. 1 is a block diagram showing a hardware configuration of each computer constituting an information presentation system of each embodiment of the present invention.

Embodiments of the present invention will be described in detail below, referring to the drawings.

FIG. 1 is a block diagram showing a hardware configuration of each computer constituting an information presentation system of each embodiment of the present invention.

In FIG. 1, a CPU 101 controls an entire information processing apparatus 1000 via a main bus 116, and controls, via an input I/F (interface) 104, an input device 110 (for example, a microphone, an image scanner, a storage device, other information processing apparatuses connected via network lines, and a facsimile apparatus connected via a telephone line) connected to the outside of the information processing apparatus 1000. It also controls, via an output I/F 105, an output device 111 (for example, a speaker, a printer, a monitor, other information processing apparatuses connected via network lines, and a facsimile apparatus connected via a telephone line) connected to the outside of the information processing apparatus 1000. Also, the CPU 101 carries out a series of processing such as input of images, image processing, processing of color transformation and output control for images in accordance with instructions inputted from an input unit (for example a keyboard 112, a pointing device 113 and a pen 114) via a KBD I/F (keyboard interface) 107. In addition, it controls via a video I/F (interface) 108 a display unit 109 displaying image data inputted from the input device 110 and image data created using the keyboard 112, pointing device 113 and pen 114.

A ROM 102 stores therein a various kinds of control programs for executing various kinds of controls of CPU 101. Those various kinds of programs, and various kinds of data required for performing each embodiment may be stored in an external storage device 106 constituted by a hard disk, a CD-ROM, a DVD-ROM and the like. In a RAM 103, the OS and other control programs including control programs for achieving the present invention are loaded and executed by the CPU 101. It also functions as various kinds of work areas that are used for executing control programs, and temporary save areas. Also, a VRAM (not shown) stores temporary image data inputted from the input device 110 and image data created using the keyboard 112, pointing device 113 and pen 114 is configured.

<First Embodiment>

In First Embodiment described below, a configuration will be described in which using character animation and voice synthesis, a virtual caster conveys the contents of news articles to users by voice in imitation of a human caster of a television program, and it is made possible to display letter strings corresponding to the article contents, thus conveying the contents to users by both voice and letter strings. Here, for example, news articles distributed via a network such as Internet from a provider of the news articles are received, are arranged by genre, and are conveyed to users in predetermined genre order. In addition, according to First Embodiment, a desired genre can be designated at any time through voice input by the user, thus making it possible provide information on demand and interactively.

Figure 2:
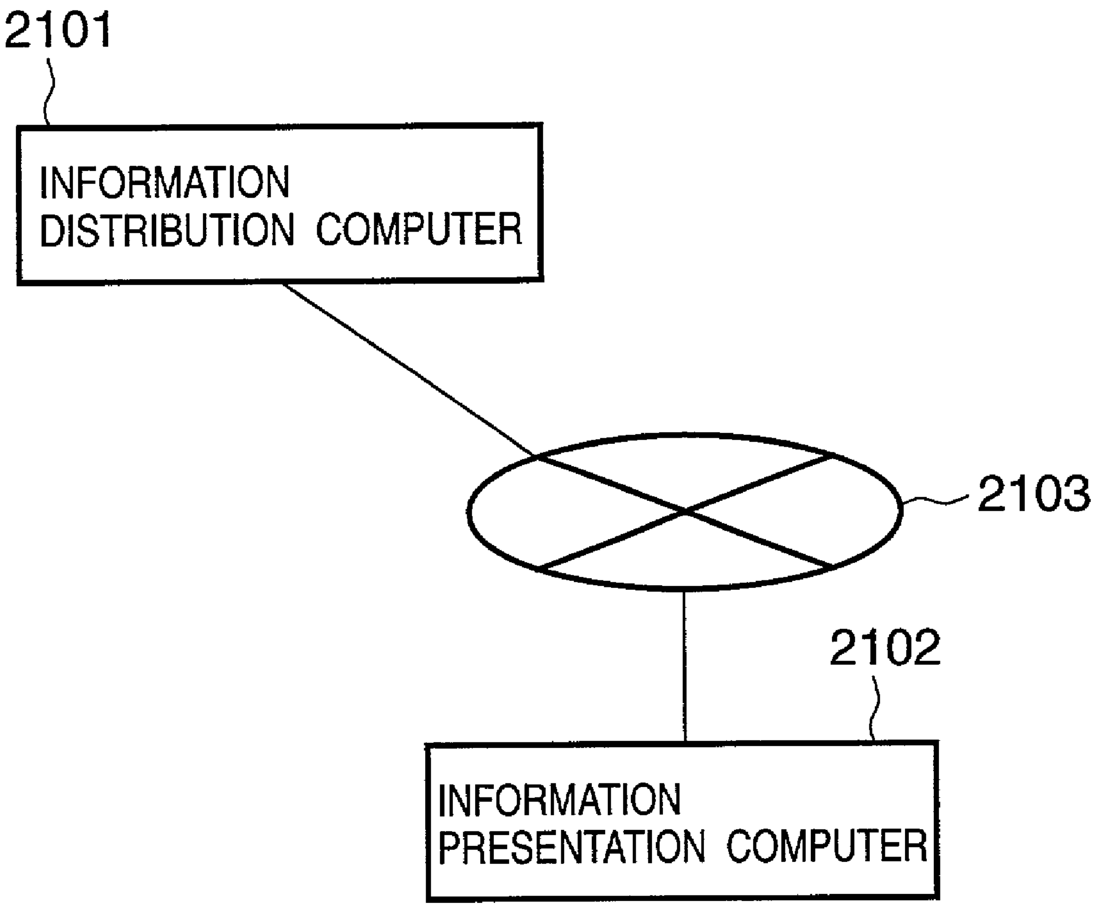
FIG. 2 is a block diagram showing a schematic configuration of the information presentation system of First Embodiment of the present invention.

FIG. 2 shows a block diagram showing a schematic configuration of the information presentation system of First Embodiment of the present invention.

In FIG. 2, an information distribution computer 2101 distributes information such as online news provided by information providers (for example, news articles provided by news information providers), via a network 2103. An information presentation computer 2102 divides distributed information such as the contents of online news distributed via the network into a synthetic voice portion for reading out the information with synthetic voice of a character (animation image) and display portion for displaying the information with letter information such as titles of news and image information such as pictures to present the distributed information to users.

The network 2103 is used for data communication between the information distribution computer 2101 and the information presentation computer 2102. Examples of this network include a wireless network, Internet and a public line.

Figure 3:
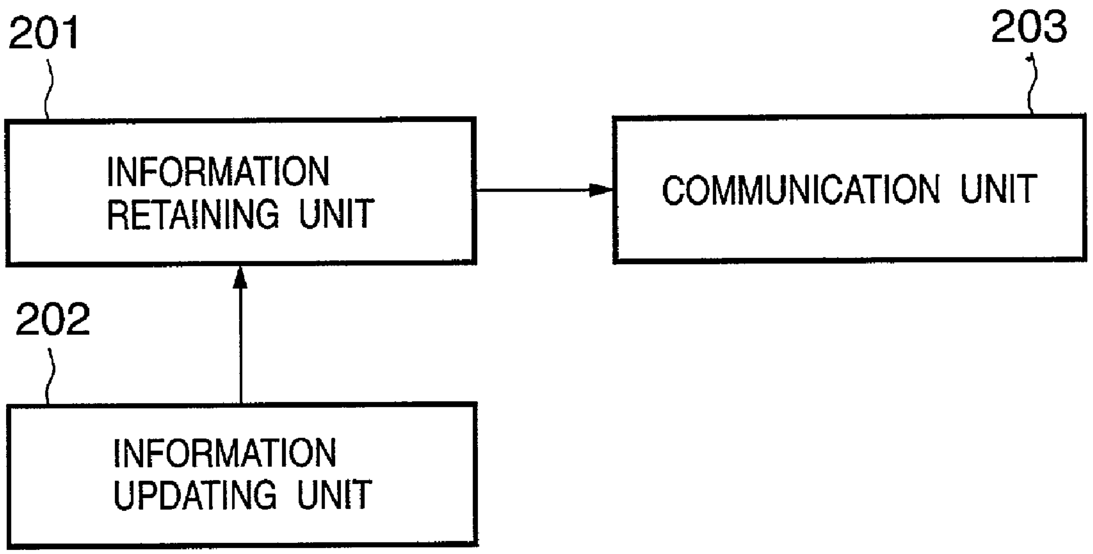
FIG. 3 is a block diagram showing a functional configuration of an information distribution computer of First Embodiment of the present invention.

FIG. 3 is a block diagram showing a functional configuration of the information distribution computer of First Embodiment of the present invention.

The information distribution computer 2101 has an information retaining unit 201 for retaining news information representing news articles to be provided to the user, an information updating unit 202 for updating to the latest the information retained in the information retaining unit 201, and a communication unit 203 for sending the news information retained in the information retaining unit 201 to the information presentation computer 2102 via the network 2103.

The news information provider inputs news information to be provided in this information distribution computer 2101, whereby the inputted news information is retained in the information retaining unit 201, and is then distributed to the information presentation computer 2102. The information presentation computer 2102 can receive this news information all the time by making access to the information distribution computer 2101.

Figure 4:
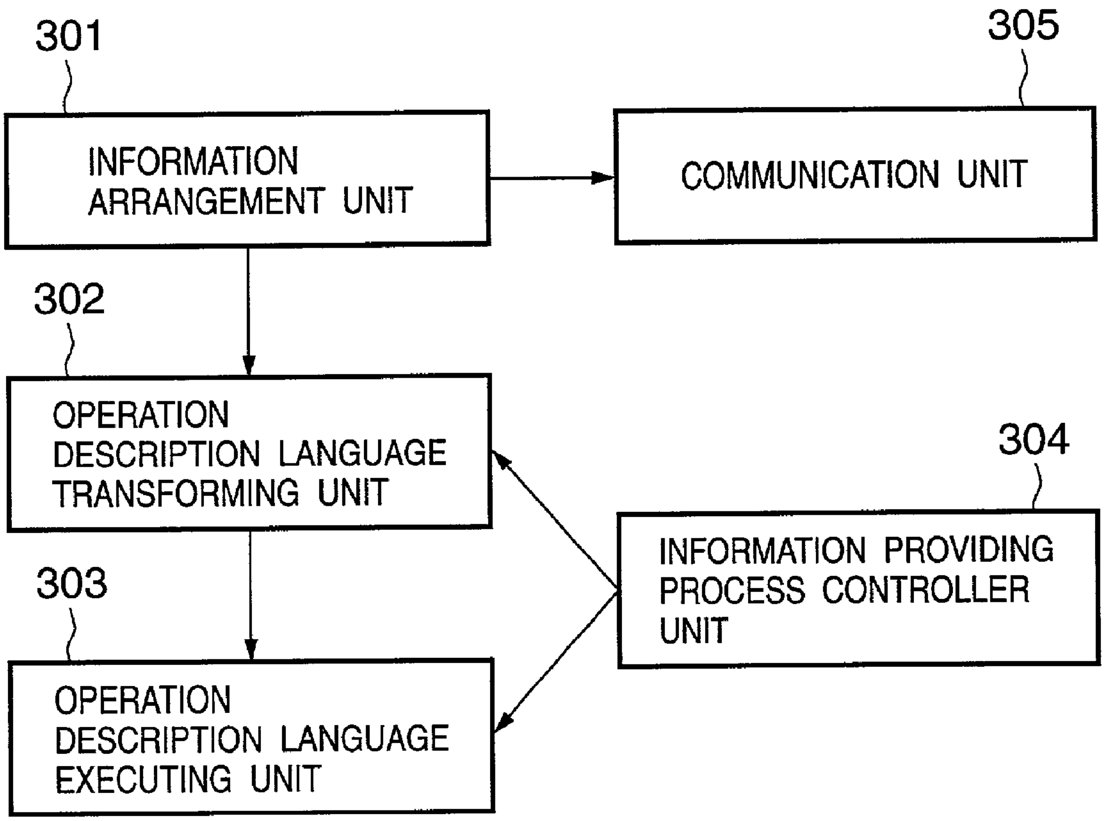
FIG. 4 is a block diagram showing a functional configuration of an information presentation computer of First Embodiment of the present invention.

FIG. 4 is a block diagram showing a functional configuration of the information presentation computer of First Embodiment of the present invention.

An information arrangement unit 301 makes arrangements such as retaining news information received from the information distribution computer 2101 by genre. An operation description language transforming unit 302 transforms news information into an operation description language. An operation description language executing unit 303 operates a virtual caster in the form of a character (animation image), makes the caster read news information through voice synthesis, and displays captions and the like on a screen, in accordance with the operation description language created by the operation description language transforming unit 302.

An information providing process controlling unit 304 manages a whole process from the start to the end of providing information to the user. In addition, if voice input by the user occurs during execution of the operation description language, the information providing process controlling unit 304 suspends the execution of the operation description language executing unit 303 to make voice recognition of the input. In this way, the information providing process controlling unit 304 manages the news genre to be conveyed, e.g. switching the news genre to a designated news genre in the case where the user designates a news genre by voice. A communication unit 305 achieves communication between the information distribution computer 2101 and the information arrangement unit 301.

Figure 5:
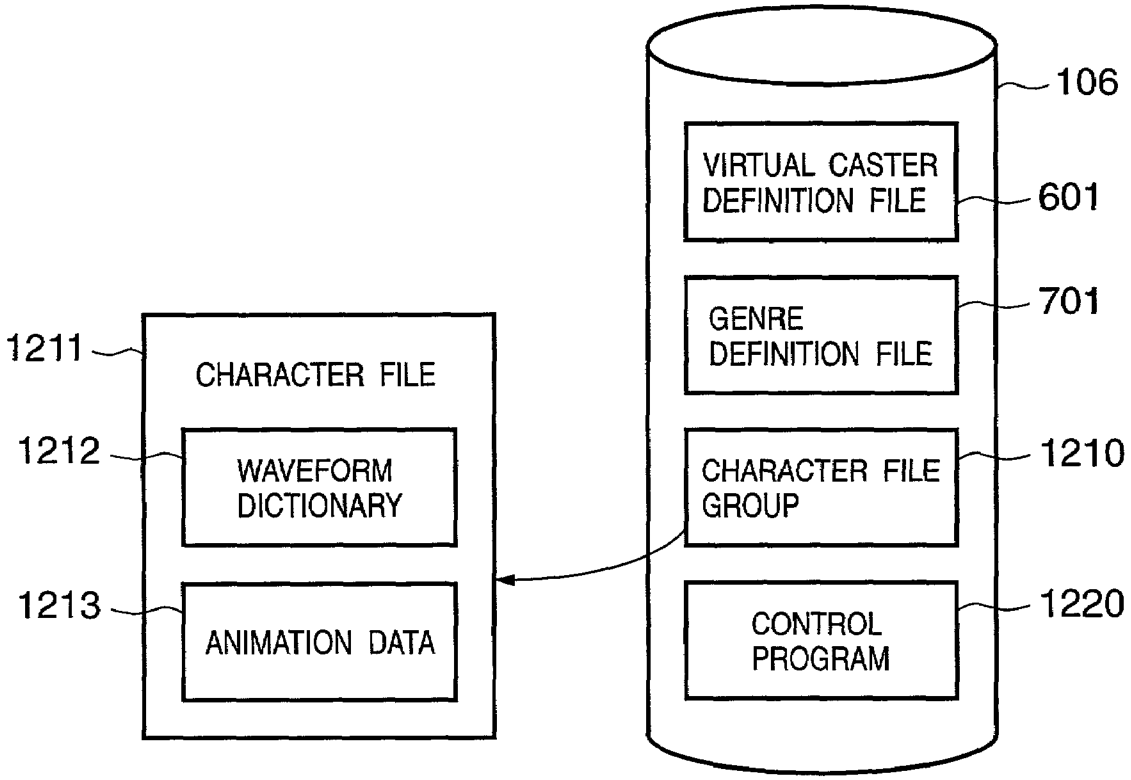
FIG. 5 shows an example of a structure of data stored in an external storage device of the information presentation apparatus of First Embodiment of the present invention.

Furthermore, in First Embodiment, a virtual caster definition file 601, a genre definition file 701, a character file group 1210 and a control program 1220 are included in the external storage device 106 of the information presentation computer 2102, as shown in FIG. 5.

The virtual caster definition file 601 is composed of data for defining the correspondence of the virtual caster with animation data and waveform data for voice synthesis (details thereof will be described later referring to FIG. 9). The genre definition file 701 is composed of data for defining the correspondence of the genre with the virtual caster (details thereof will be described later referring to FIG. 10). The character file group 1210 includes a plurality of character files (1211). Each character file 1211 includes animation data 1213 for providing animation display of the character and a waveform dictionary 1212 for performing voice synthesis. The control program 1220 is a group of program codes for having achieved by the CPU 101 the control procedure shown by the flowchart in FIG. 6.

Figure 6:
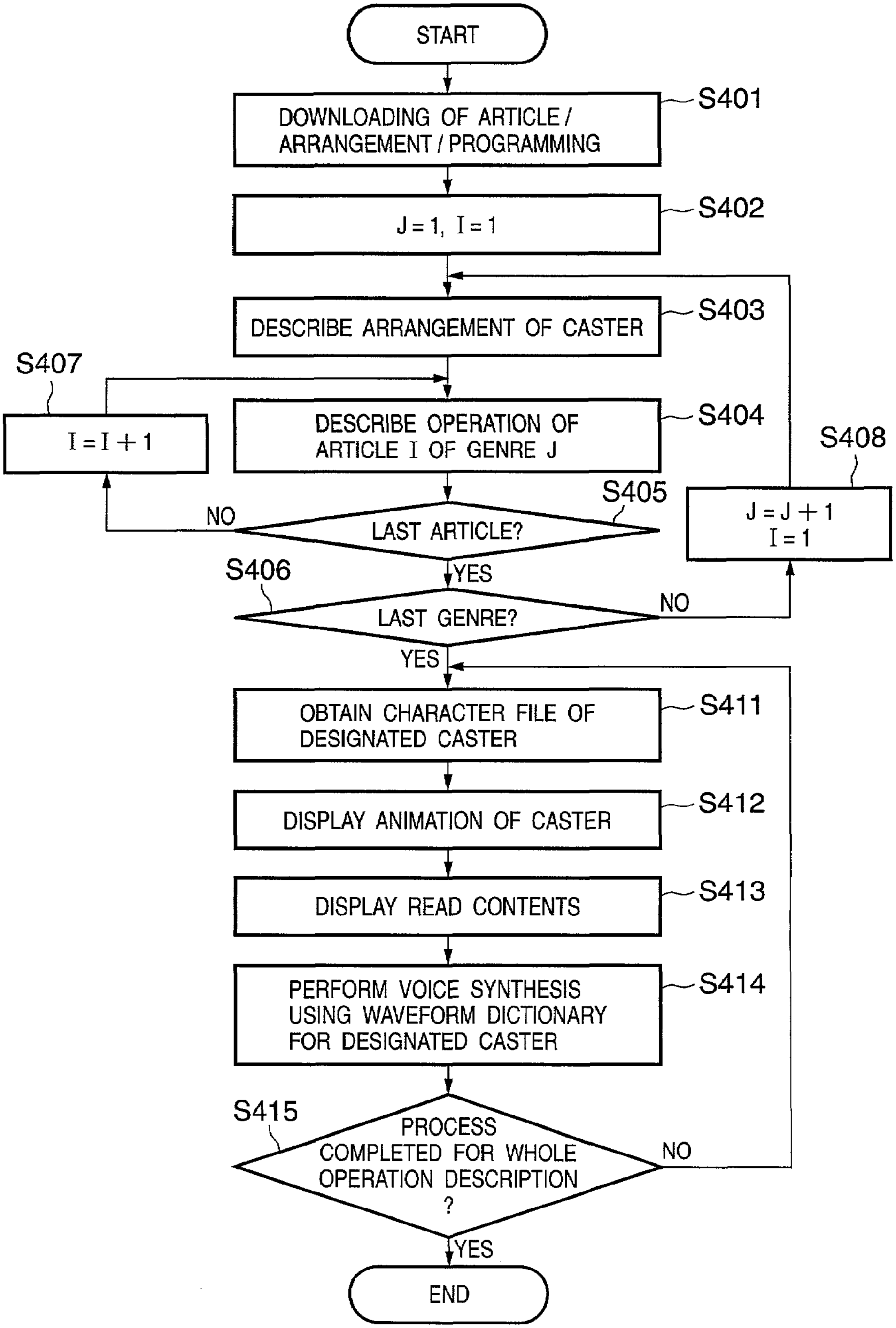
FIG. 6 is a flowchart showing a procedure for processing carried out in the information presentation system of First Embodiment of the present invention.

FIG. 6 is a flowchart showing a procedure for processing carried out in the information presentation system of First Embodiment of the present invention.

First, the information arrangement unit 301 of the information presentation computer 2102 communicates with the information distribution computer 2101 via the communication unit 305 (network interface 1207) and the network 2103 to download news information, and arrange the information by genre as shown in FIG. 7 (step S401).

Furthermore, for arranging the downloaded news information in the form shown in FIG. 7, the correspondence of the news information with the genre may be designated manually, or data of the news information may be analyzed to establish their correspondence automatically. In the case where the information arrangement unit 301 establishes correspondence automatically, the following procedures may be followed, for example.

Figure 8:
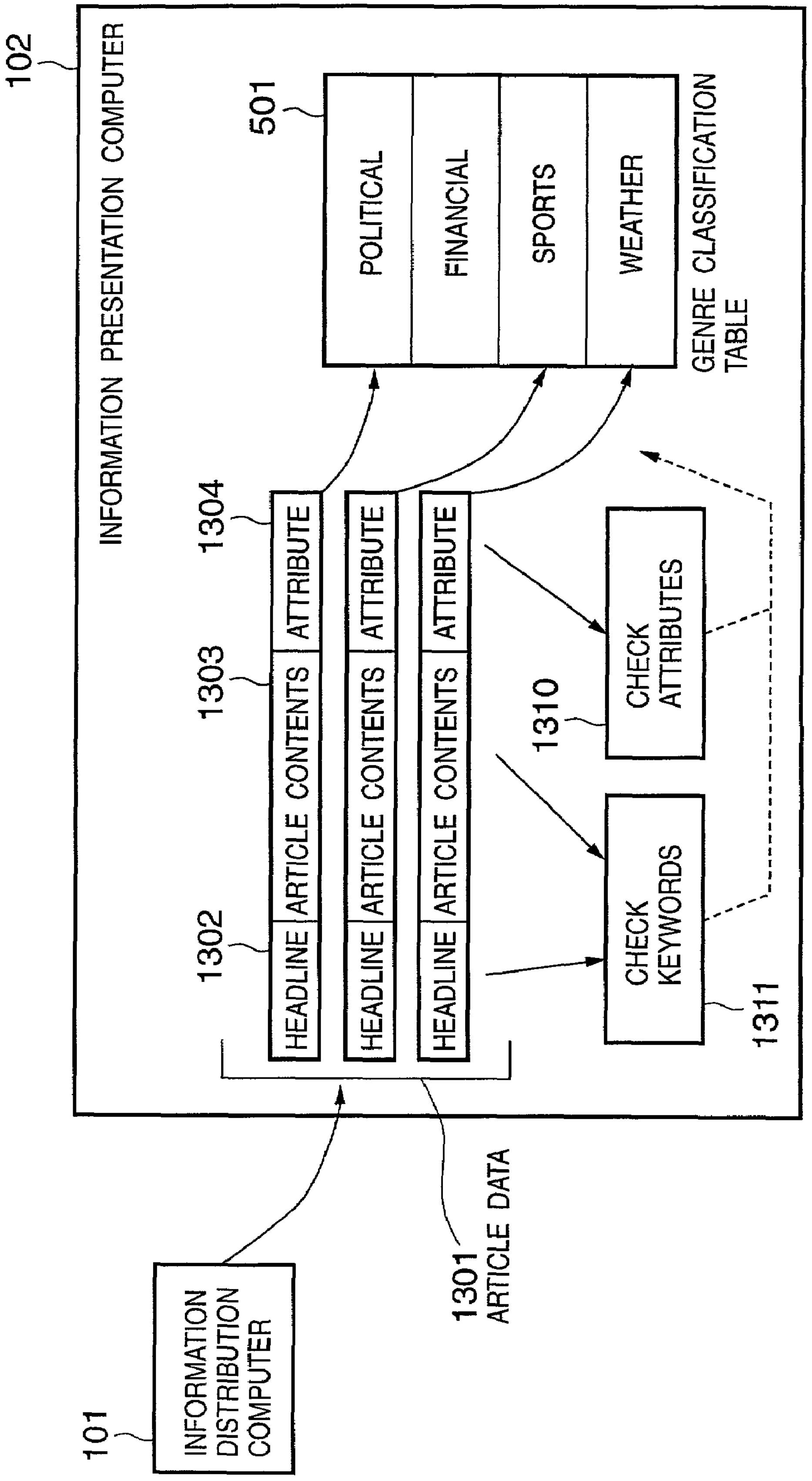
FIG. 8 illustrates classification of news articles by genre in First Embodiment of the present invention.

(1) As shown in FIG. 8, article data 1301 sent to the information presentation computer 2102 by the information distribution computer 2101 has headlines 1302, article contents 1303 and attributes 1304. The information presentation computer 2102 makes a classification by genre (1310) based on each attribute 1304 of the received article data 1301, and in accordance therewith, the headlines and article contents (bodies) are classified as shown in FIG. 7.

(2) Alternatively, a keyword search is made for at least any one of the headlines 1302 or the article contents 1303 included in the article data 1301, the genre of the article is determined (1311), and the headlines and article contents (bodies) are classified as shown in FIG. 7.

Furthermore, in the case where the above method (2) is used, the attributes 1304 of the article data 1301 are not necessary. Also, the above method (1) may be used in combination with the above method (2) as a matter of course. In addition, in First Embodiment, the result of classifying news information by genre is retained as a genre classification table 501 as shown in FIG. 7, but the method of retaining the above described result of genre classification is not limited thereto.

Also, in subsequent processes, information is presented in the order of genre numbers shown in FIG. 7, but needless to say, a configuration may be made so that the user sets this number as desired.

In addition, at this time, the information providing process controlling unit 304 determines a structure for providing information. The structure for providing information refers to a settlement as to which virtual caster is made to speak about which genre, and how the letter strings expressing the spoken contents are displayed. As information for determining the structure for providing information, virtual casters, backgrounds and article genres are set as shown in FIGS. 9 and 10.

FIG. 9 shows one example of the contents of a virtual caster definition file of First Embodiment of the present invention.

The virtual caster definition file 601 establishes the correspondence of the names of virtual casters with the animation data 1212 that are used and the waveform dictionary 1213 for voice synthesis. The “tag<>” represents the definition of each virtual caster, and its name is defined by the “name”. The “color” refers to the color of letters constituting letter strings when the spoken contents of the virtual caster are displayed on the screen. For this, a different color is assigned to each virtual caster. Also, the “file” specifies the character file 1211 defining the waveform dictionary 1212 that is used when the voice of the virtual caster is voice-synthesized, the animation data (image data) 1213 and the like. Furthermore, since the waveform dictionary 1212 and animation data 1213 can be achieved by using conventional techniques, and details thereof are not described here.

FIG. 10 shows one example of the contents of the genre definition file for defining each news genre of First Embodiment of the present invention.

In genre definition file 701, the correspondence of the news genre with the virtual caster is registered. The “tag <>” defines the news genre, and its name is defined by the “name”. And, the “caster” specifies a virtual caster to convey the news of the genre.

Furthermore, the above virtual caster definition file 601 and the genre definition file 701 may be created by the news information provider and distributed at the time of distributing news information, or they may be retained previously in the information presentation computer 2102 to suite user preference. In First Embodiment, the data shown in FIGS. 9 and 10 are previously retained in the external storage device 106, in the information presentation computer 2102. Of course, the contents of each definition may be changed manually.

When initialization described above is completed, the operation description language transforming unit 302 generates an operation description language to provide news to the user through processes of steps S402 to S408. That is, the operation description language transforming unit 302 performs transformation to an operation description language as shown in FIG. 11 referring to the genre classification table 501 shown in FIG. 7, the virtual caster definition file 601 shown in FIG. 9 and the genre definition file 701 shown in FIG. 10.

First, the genre number J of news to be conveyed to the user is initialized at 1, and the article number I is initialized at 1 (step S402). Then, at step S403, a command for displaying a virtual caster that reads out the article of genre J is described (801 in FIG. 11), and at step S404, the display of the headline, voice output, and the display of letter strings (captions) expressing the contents of voice output are described for the Ith article data of the genre J, as shown by 802 in FIG. 8. The headline and the contents of voice output correspond to the headline 1302 and the article contents 1303 in the article data 1301, and can easily be identified from data described with HTML and the like.

For example, J=1 refers to the "political" genre, and virtual casters to convey news are "mainCaster, subCaster" according to the genre definition file 701 in the scene of this genre, and thus an operation for making these two casters appear in defined position (position1, position2) is described ("Caster→Show (mainCaster, position1)", "Caster→Show (subCaster, position2)").

Then, an operation of displaying in front the letter string of the headline of the I=1st news article is described ("FrontText→Display (Opposition parties opposing Prime Minister's announcement of tax reduction policy"). Here, a predetermined color is assigned for the color of the letter string of the headline, and in this example, the headline is expressed in red color. Furthermore, for the letter color for the letter string of the headline, a color that is not assigned to any caster is preferably assigned. For this reason, the headline can easily be identified from letter strings that are read out.

Then, an operation of making the virtual caster reading out the article contents is described ("Caster→Speak (Prime Minister XXX . . . "substantial tax reduction". . . , mainCaster"), and an operation of displaying captions on the screen in designated color for each virtual caster is described ("SpokenText→Display (Prime Minister XXX . . . "substantial tax reduction". . . , white"). Here, the operation description language transforming unit 302 reads the display color shown by the "color" for the caster from the virtual caster definition file 601 in FIG. 9 on the basis of the "mainCaster", and describes the same.

Furthermore, in the case where a plurality of virtual casters is defined like the political genre, virtual casters reading out captions may be changed one after another for each sentence.

When all the operation description language for one article is executed completely, whether or not the article is the last article in the genre J is checked (step S405), and if it is not the last article, the value of J is left unchanged and I is incremented (step S407), and the process returns to step S404, thereby performing transformation to the operation description language of the next news article in the same genre. On the other hand, if it is determined at step S405 that the article is the last article in the genre J, whether or not the genre J is the last genre to be read out lastly is checked (step S406). If it is not the last genre, J is incremented by one, I is initialized at 1 (step S408), and the process returns to step S403 for processing the next genre.

If it is determined at step S406 that the genre is the last genre, the process proceeds to step S411, where the operation description executing unit 303 performs display of character animations, display of characters and voice synthesis/output in accordance with the operation description language generated through the above described processes.

The corresponding character 1211 is obtained from the caster definition file 601 with the names of casters designated in operation description language at step S411, and animation characters are displayed based on the animation data 1213 included in the obtained character file 1211, at step S412. Then, at step S413, an example of text described with the above described SpokenText→ is displayed in a designated color. Then, at step S414, the waveform dictionary 1212 included in the character file 1211 obtained at step S411 is used to voice-synthesize an example of text described with the above described Caster→Speak and voice-output the same.

At step S415, whether or not processing has been performed for all the data transformed into the operation description language is determined, and if there exists data to be processed, the process returns to step S411. Also, if processing is completed, this process is ended. Furthermore, in the above described procedure, transformation to the operation description language for all of the data arranged as shown in FIG. 7 before the execution of the operation description language is started, but execution of the operation description language may be started before transformation to the operation description language is completed.

Figure 12:
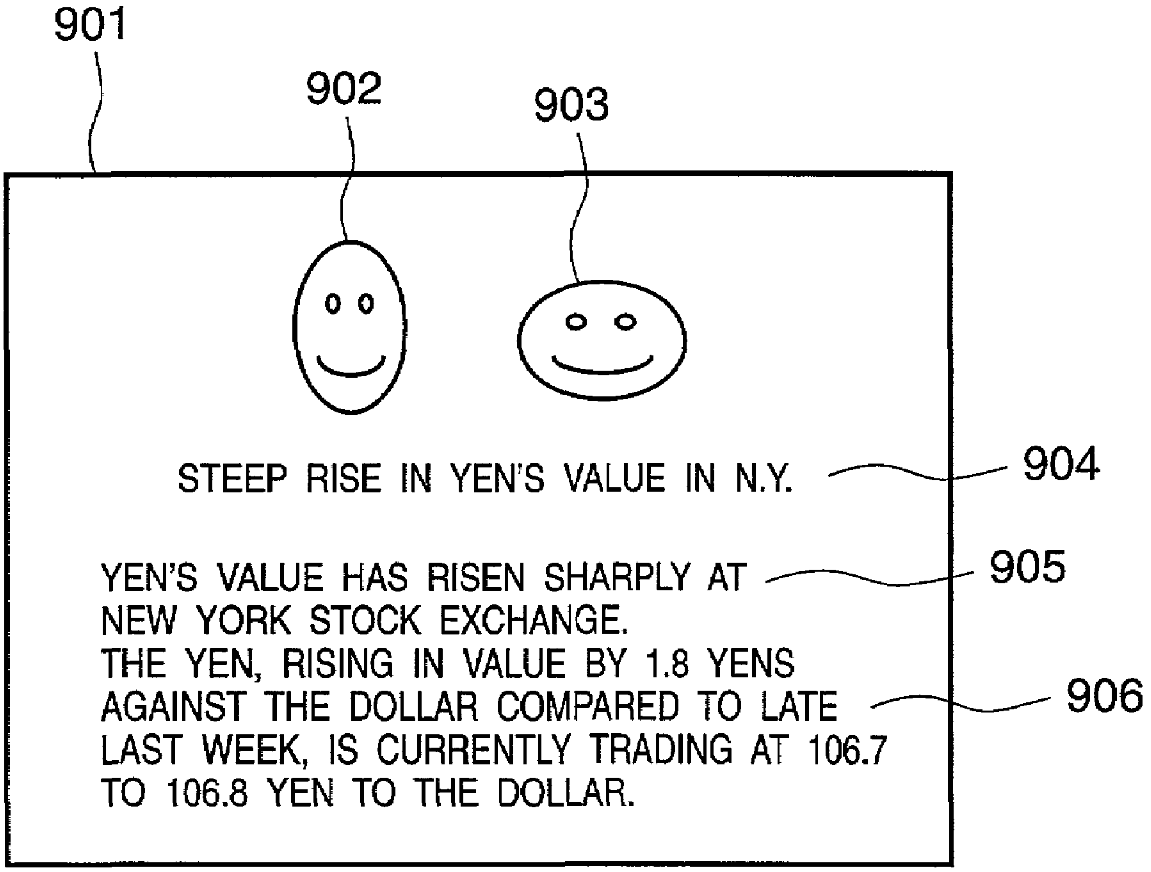
FIG. 12 shows an example of displaying screens in First Embodiment of the present invention.

FIG. 12 shows an example of a screen presented to the user when information is provided in First Embodiment of the present invention.

On a screen 901, virtual casters operate and captions of a news article are presented to the user. Virtual casters 902 and 903 read out the news article including a headline 904. Captions 905 and 906 display the contents spoken by the virtual casters 902 and 903, respectively.

In FIG. 12, for captions, letter colors different for each speaking virtual caster are defined by the "color" in FIG. 9. All the contents spoken by the virtual caster 902 are displayed in a color identical to that of the display 905 while all the contents spoken by the virtual caster 903 are displayed in a color identical to that of the display 906, and they are thus displayed in colors different for each virtual caster. Also, a display color is specified in advance for the headline of the article 904, which is displayed in a letter color different from those of the contents spoken by the virtual casters.

As described above, according to First Embodiment, since the distributed news article is read out through voice synthesis, it is not necessary to focus attention on the screen all the time to read displayed text, and thus information can be collected with ease.

Also, in addition to voice synthesis/output, the headline of the article is displayed with captions and the read-out contents are displayed with captions, thereby enabling the contents to be recognized correctly even if the system is used by a visually impaired person, and if the contents cannot be heard well due to loud noise occurring around. In addition, according to First Embodiment, a display is provided in such a manner that the letter colors of captions corresponding to the headline and each caster are different from one another, thus making it possible to understand easily which caption corresponds to the headline and which caption corresponds to the contents read out by the virtual caster, of captions of the article displayed diversely in the screen, and which virtual caster displayed in the screen reads out the contents.

Furthermore, in the above described First Embodiment, the headline and the spoken contents are displayed with the letter color is defined for the headline and each virtual caster, but the invention should not be limited thereto. It is essential only that the user understand whether the displayed character corresponds to a headline or which virtual caster speaks the contents, and for making the user understand it, display forms different for the headline and each virtual caster may be used.

Figure 13:
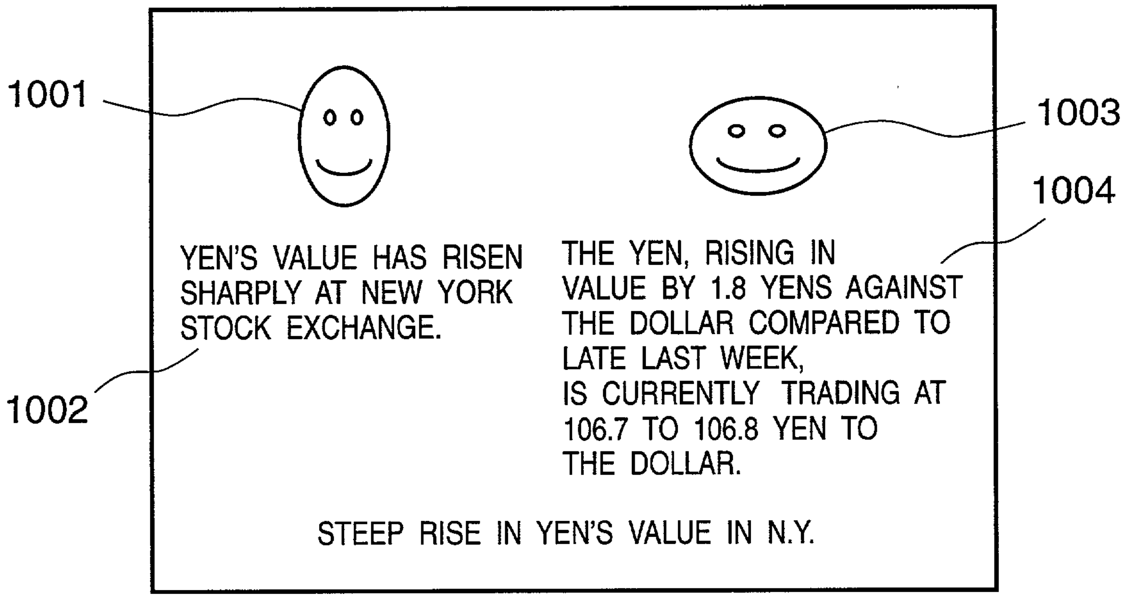
FIG. 13 shows another example of displaying screens in First Embodiment of the present invention.

For example, FIG. 13 shows an example in which the spoken contents of respective virtual caster are displayed near the virtual casters to specify the contents of each caster. To achieve this such display, an operation description language as shown in FIG. 14 is generated in the operation description language transforming unit 302, and this language is executed by the operation description language executing unit 303.

As shown in FIG. 14, in the description expressing display of the spoken contents, the position of display of the speaking virtual caster is additionally described. For example, it is expressed with a description such as "SpokenText→Display (Prime Minister XXX . . . "substantial tax reduction". . . , white, position1) that captions are displayed in a defined position relative to the "position2" that is a position in which the "mainCaster" is displayed (1101 of FIG. 14). Similarly, captions are displayed in a defined position relative to the "position2" that is a position in which the "subCaster" is displayed, in accordance with the description denoted by reference numeral 1102 in FIG. 14. Furthermore, for these relative positions of captions, predetermined values may be used, or values may be defined in the above operation descriptions. Also, in this case, the color of letters of the spoken contents of each virtual caster is not necessarily different for each virtual caster. With the above description 1101, a caption of the spoken contents 1002 is displayed near an animation of mainCaster 1001, and a caption of the spoken contents 1004 is displayed near an animation of subCaster 1003, as shown in FIG. 13.

Examples in which letter colors and display positions are used as display forms different for the headline and each virtual caster have been described above, but it can be considered there exist variations in addition thereto. For example, it is possible to use different letter sizes or styles, different backgrounds for caption portions and different ruled lines for the headline and each virtual caster.

Also, in the above described First Embodiment, the definition of virtual casters, the definition of news genres and the operation description language are described as shown in FIG. 9, FIG. 10 and FIG. 11, respectively, but they are not limited thereto, and any description format may be used as long as it is satisfied for uses of the above described Example 1.

Also, in the above described First Embodiment, news articles have been described as an example of distributed data, but the information presentation method of this First Embodiment may be applied for other data such as various kinds of advertisements.

Also, in the above described First Embodiment, the case has been described in which each data communication is performed by using Internet, but it is not limited to Internet, and any communication means, for example a dedicated line may be used.

In the above described First Embodiment, the case has been described in which programs are retained in the external storage device 106 and are loaded into the RAM 103 to use the programs, but the storage medium is not limited thereto, and any storage medium such as the ROM may be used to achieve the embodiment. Also, a circuit operating in a similar way may be used to achieve it.

<Second Embodiment>

In First Embodiment, for characters not restricted to a specific window, they can be made to appear in positions predefined by the system, or the user can freely move their positions. However, there may be cases where the position in which the character is displayed may accidentally overlap the position in which other information is displayed, and the character blocks the user's view.

When the character is placed in the position predefined by the system, if letter information and image information to be displayed by the system at the same time is displayed behind the character, the character is displayed on letter information and image information, and the information under the character is covered and hidden from the user's view. If letter information and image information are displayed in front of the character, the character is covered and hidden from the view.

When the user moves the character, the contents of letter information and image information displayed under the moved character may be changed, and even if the contents that the user wants to see are displayed under the character, they may be unnoticed by the user.

Also, displayed letter information and image information are automatically updated as in the case of Internet and online news, unfavorable words and images may be displayed accidentally.

Then, in Second Embodiment, the position in which the character is presented is controlled based on the letter information and image information displayed together with the character, thereby providing information more effectively.

Figure 15:
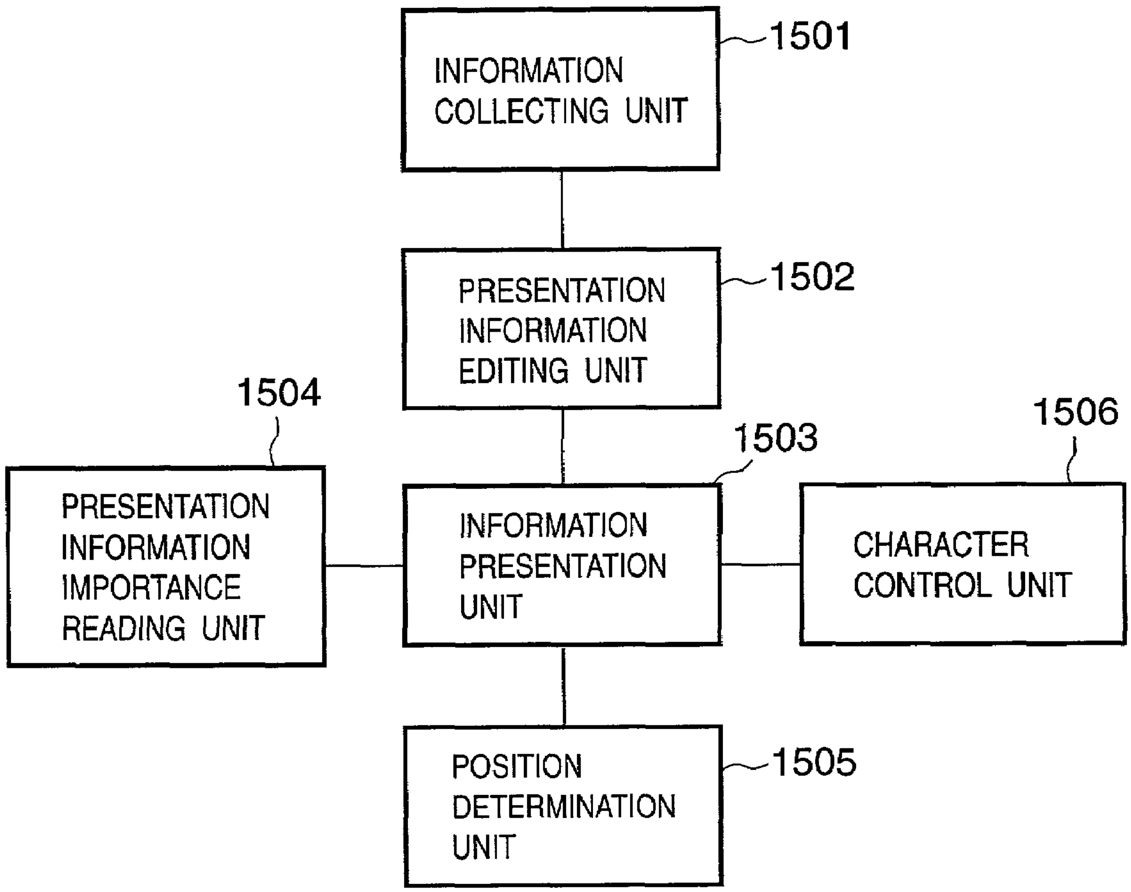
FIG. 15 is a block diagram showing a functional configuration of the information presentation system of Second Embodiment of the present invention.

FIG. 15 is a block diagram showing a functional configuration of the information presentation system of Second Embodiment.

The information presentation system processes information distributed from the information distribution computer 2101 into a synthetic voice portion read out with synthetic voice in the information presentation computer 2102, and a portion displayed as images, and in particular, the synthetic voice portion is presented to the user in synchronization with the character (animation image). In Second Embodiment, the character is controlled through a server program, and the information presentation computer 2102 only requires the server program to control the character.

An information collecting unit 1501 collects distributed information distributed from the information distribution computer 2101. An information editing unit 1502 divides the distributed information collected into a synthetic voice portion read out with the synthetic voice of the character and a display portion displayed as letter information and image information, and arranging the same in specified order. An information presentation unit 1503 presents edited distributed information in succession.

An importance reading unit 1504 reads the importance as to presented letter information and image information. A positional relation determining unit 1505 determinies a positional relation between the letter information and image information and the character.

A character controlling unit 1506 makes a request to read out information to be read out through synthetic voice of the character, and makes a request for movement when the letter information and image information and the character overlap one another.

Figure 16:
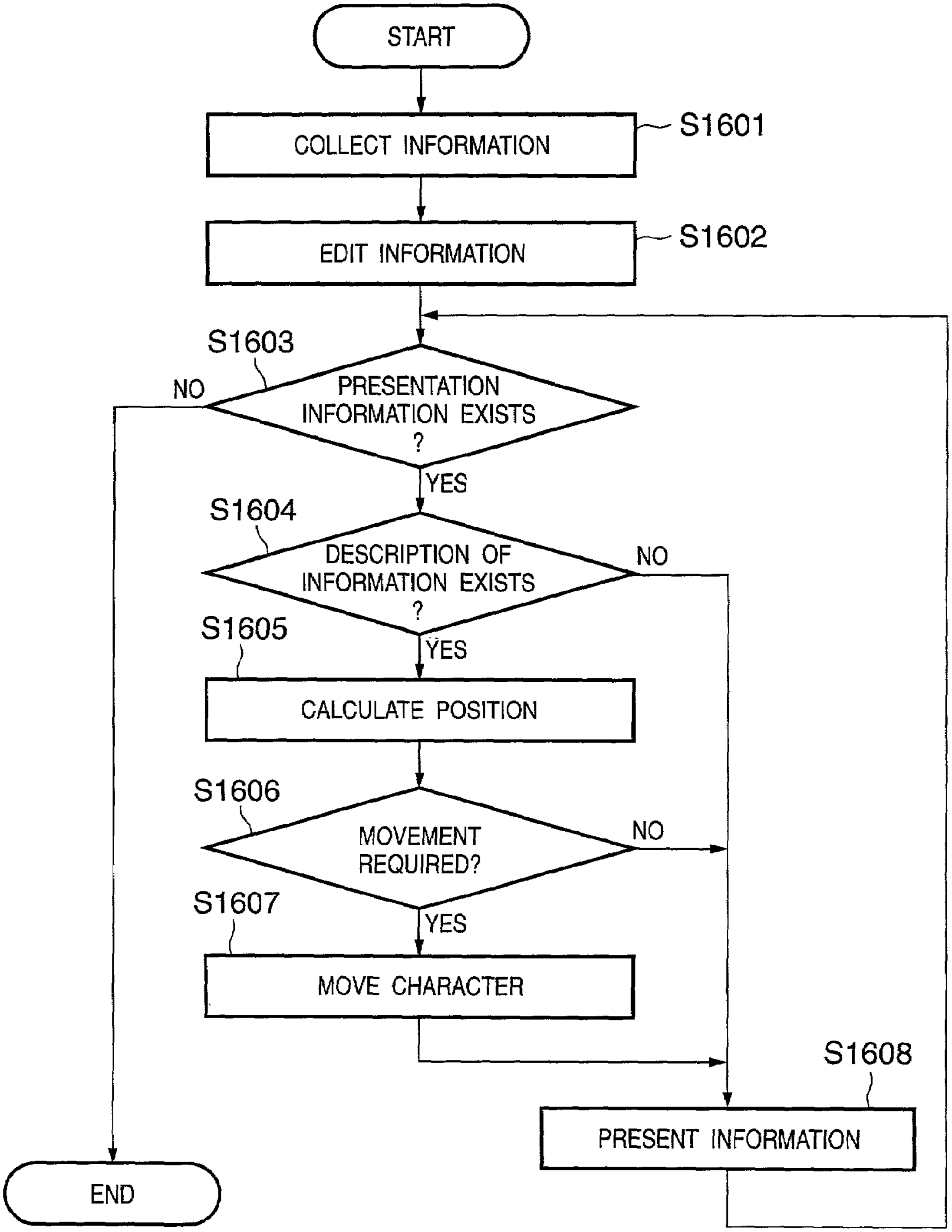
FIG. 16 is a flowchart showing a procedure for processing carried out in the information presentation system of Second Embodiment of the present invention.

FIG. 16 is a flowchart showing a procedure for processing carried out by the information presentation system of Second Embodiment of the present invention.

At step S1601, distributed information distributed from the information distribution computer 2101 is collected. At step S1602, the distributed information collected is divided into a synthetic voice portion read out through the synthetic voice of the character and a display portion displayed as letter information and image information, and is arranged in specified order. In Second Embodiment, the network 2103 is Internet and online news on Internet is collected, and is divided as a display portion with headlines, tables and the like in the online news displayed as letter information and photo images in the online news displayed as image information, and a synthetic voice portion with the whole text of the online news read out through the synthetic voice of the character. Actually, the information in the online news is divided into the display portion and synthetic voice portion based on a tag and the like described in HTML documents constituting the online news as described in First Embodiment. In addition, the online news is classified into financial news, political news, sports and weather reports in accordance with types of news, and is rearranged in specific order. Also, when the information is divided, the server program determines the importance of the information based on position information showing the position in which information such as types of news is displayed, adds the importance and their important points to the letter information and image information in the online news, and associates the letter information and image information with the importance and important points added thereto to manage them.

At step S1603, whether or not there exists presentation information is determined. If there exists no presentation information (NO in step S1603), the process ends. On the other hand, if there exists presentation information (YES in step S1603), the process proceeds to step S1604.

Furthermore, in the case of Second Embodiment, whether online news is presented on a one-by-one basis or the process is ended is determined for each type thereof at step S1603. The presentation information in this case also includes letter information and image information corresponding to a display portion, and a synthetic voice portion read out by the character. If no presentation information remains, the process ends.

At step S1604, whether or not there exists a description as to importance in the letter information and image information to be presented is determined. If there exists no description as to importance (NO in step S1604), the process proceeds to step S1608. On the other hand, if there exists a description as to importance (YES in step S1604), the process proceeds to step S1605.

At step S1605, a positional relation between the important point added to the letter information and image information to be presented and the character is calculated.

At step S1606, whether or not it is necessary to move the character, namely whether or not the letter information and image information and the character overlap one another is determined based on the calculated positional relation. If it is not necessary to move the character (NO in step S1606), the process proceeds to step S1608. On the other hand, if it is necessary to move the character (YES in step S1606), the process proceeds to step S1607.

At step S1607, a request is made to move the character from the current character display position to a character display position such that a distance of movement from the image display position is the minimum, in order to prevent a situation where the image display position in which the letter information and image information are displayed overlap the character display position in which the character is displayed.

At step S1608, information is presented. The presentation of information in this case refers to the displaying of the letter information and image information to be displayed and the reading out of the information through the synthetic voice of the character. When one presentation of information is completed, e.g. information to be read out is read out completely, the process returns to step S1603, where presentation of information is repeatedly performed as long as information to be presented remains.

Specific examples of the above described processing will be described using FIGS. 17 to 19.

FIG. 17 shows an example of a structure of data that is managed when importance is added to the letter information and image information in Second Embodiment of the present invention.

As described above, when importance is added to the letter information and image information in distributed information, their important points are associated therewith to be managed. The important point refers to the display position on the display screen of the information presentation computer 2102, and for example, the important point is defined as "center" if the position corresponds to the center of the display screen and the important point is defined as "whole" if the position corresponds to the whole of the display screen.

The example of FIG. 17 is an example of the case where "weather reports" and "airline seat availabilities" are collected as distributed information from the information distribution computer 2101. This example shows the case where importance is added to the "weather satellite image" being image information in the information of "whether reports" and the "center" is defined as its important point, and importance is added to letter information in the information of "airline seat availabilities" and the "whole" is defined as its important point.

Figure 18:
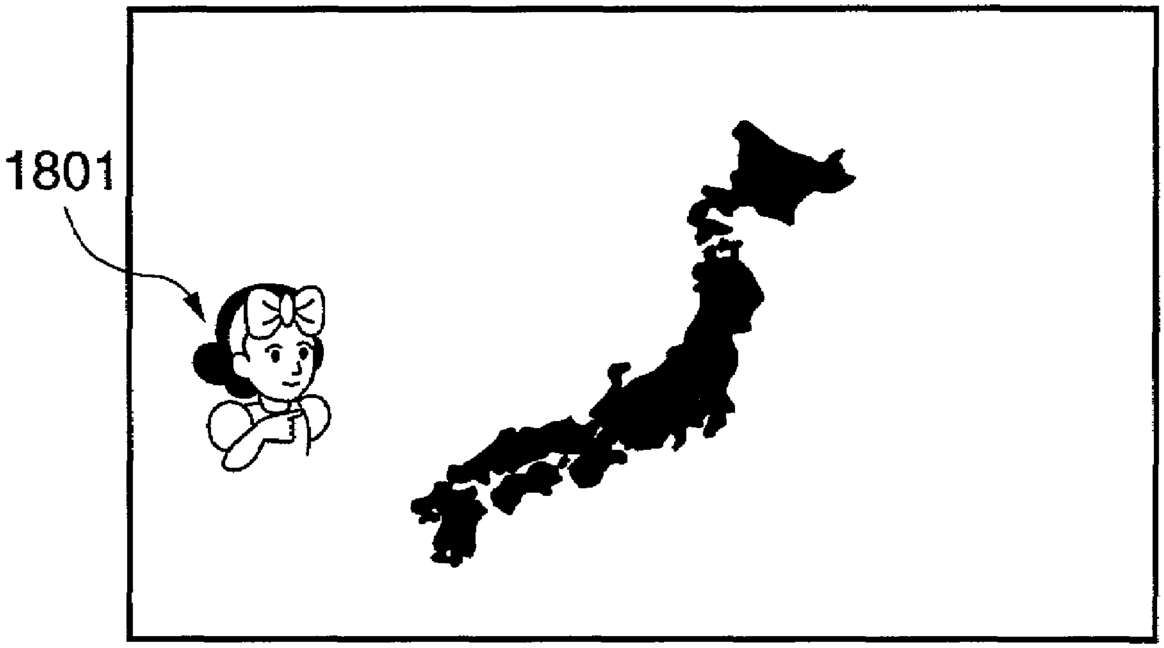
FIG. 18 shows an example of displaying screens in Second Embodiment of the present invention.

And, FIGS. 18 and 19 show cases where characters are presented with "weather reports" and "airline seat availabilities", respectively, and in FIG. 18, a character 1801 is shifted in the right direction so that the character does not overlap the "center" that is a display position in which the "weather satellite image" is displayed. Also, in FIG. 19, a character 1901 is shifted in the upper direction so that the character does not overlap the "whole" that is a display position in which the "airline seat availabilities" is displayed.

In the above described Second Embodiment, the importance of the letter information and image information in distributed information is determined based on their position information, but the importance of the letter information and image information may be determined based on the importance added in advance by the information distribution computer 2101 and information of restrictions on viewing such as exclusion of people under eighteen yeas of age.

Also, it is possible to apply information processing such as natural language processing and image recognition to the letter information and image information in distributed information, and dynamically determine the importance of the letter information and image information based on the result of the processing.

Also, it is possible to determine dynamically the positions in which discriminating expressions and unfavorable images based on the result of the processing, and place characters over information needing to be prevented from being displayed such as letter information including a discriminating expression and unfavorable image information to hide such information from users' view, for example, based on the result of the determination.

Also, when the character is placed over the information needing to be prevented from being displayed, the character may be enlarged if the region in which the information is displayed is so large compared to the character that the information cannot be hidden.

In this way, flags for controlling character display positions (importance and the need for hiding information, and important points and points in which information needs to be hidden) are added to the letter information and image information in distributed information, and the display position is controlled based on the added flags so that the position in which the character is displayed does not overlap or overlaps the position in which the letter information and image information are displayed, thereby making it possible to present information more suitably.

Also, if the region in which information needing to be prevented from overlapping the character is displayed is so large that the information cannot be prevented from overlapping the character, the character may be downsized or erased on a temporary basis.

Also, prior to the presentation of information, the position in which the character is displayed is controlled so that the letter information and image information are prevented from overlapping the character, but they may be displayed in such a manner that they overlap one another on a temporary basis before the position in which the character is displayed is controlled.

Also, prior to the presentation of information, the position in which the character is displayed is controlled so that the letter information and image information are prevented from overlapping the character, but if the user moves the character to cause overlapping during presentation of information, the position in which the character is displayed may be controlled in such a manner as to avoid the overlapping.

As described above, according to Second Embodiment, the importance of and the need for the hiding of letter information and image information presented together with the character are described, the position in which the letter information and image information are presented and the position in which the character is presented are calculated, and the position in which the character is presented is controlled so that they are prevented from overlapping one another or they are caused to overlap one another, thereby making it possible to present information more effectively.

<Third Embodiment>

As described in First Embodiment, when the virtual caster reading out in synthetic voice news articles provided by the news articles provider conveys a news article to users in the manner of television programs, the user indicates and inputs by voice a desired news genre, and the inputted voice is voice-recognized, whereby the news article and the character can be changed to those of the desired news genre.

In this case, when one news genre is ended and switching to the next news genre is taking place, or when the user designates by voice a desired news genre, the switching of the news genre can be confirmed only by the fact that the character is switched visually, and it may be difficult to confirm aurally the switching of the news genre particularly for users who are not familiar with such a system.

Then, in Third Embodiment, more effective presentation of information is achieved with respect to such a point.

Figure 20:
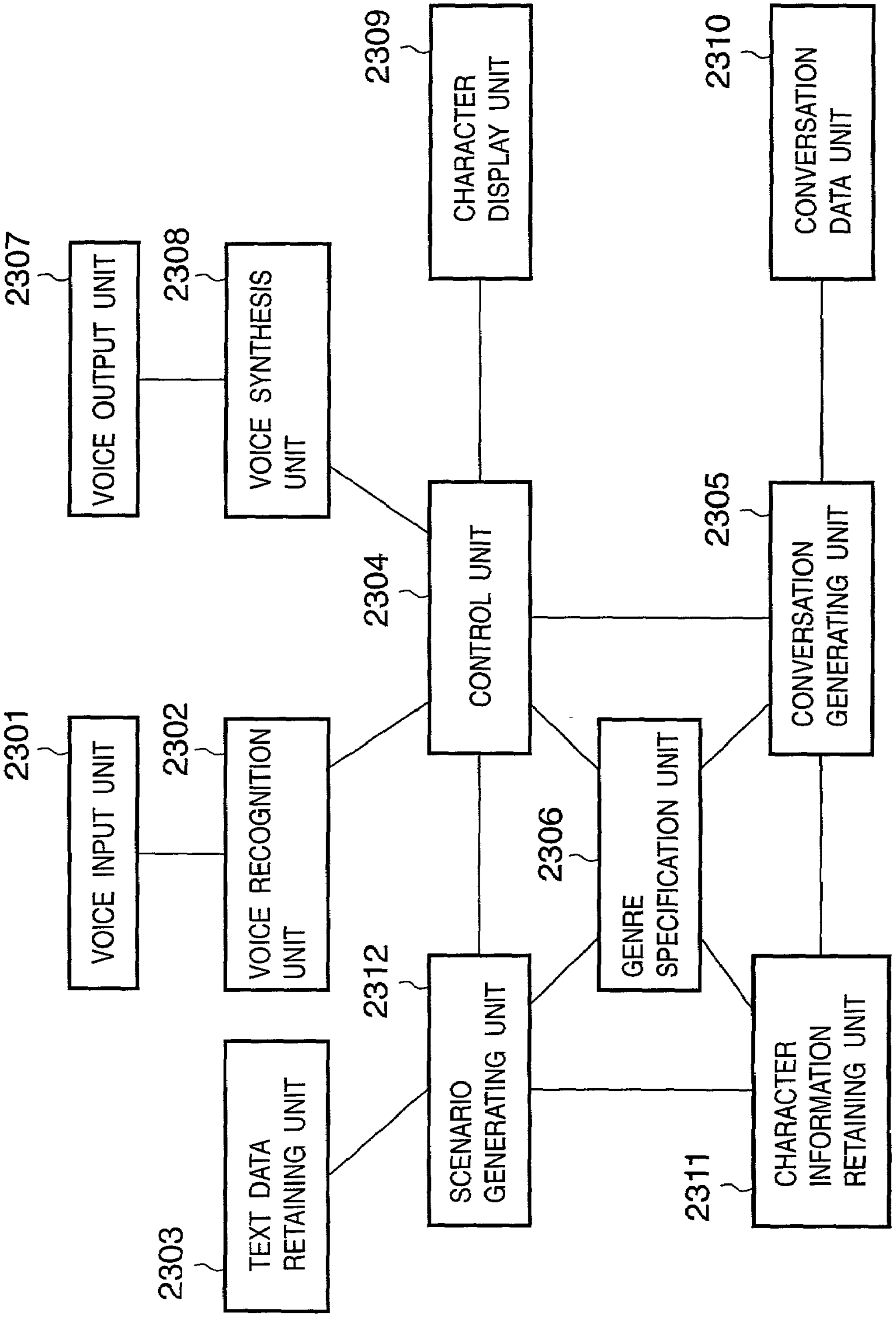
FIG. 20 shows a functional configuration of the information presentation apparatus of Third Embodiment of the present invention.

FIG. 20 shows a functional configuration of the information presentation apparatus of Third Embodiment of the present invention.

In FIG. 20, a voice input unit 2301 performs various kinds of voice input for indication of a genre of information to be provided, indication of completion of presentation of information and the like by user's voice input. A voice recognition unit 2302 recognizes the user's voice inputted with the voice input unit 2301. A scenario generating unit 2312 creates a scenario by genre from text data and character information. A text data retaining unit 2303 retains text data of each information such as news by genre. A character information retaining unit 2311 retains character information with the type and name of the character (animation image) brought into correspondence with the genre read out by the character.

Furthermore, various kinds of information of text data retained in the text data retaining unit 2303 may be information stored in the external storage device 106, information distributed via the network 2103 from other terminals (e.g. information distribution computer 2103) or the external storage device.

A voice synthesis unit 2308 transforms into synthetic voice a scenario created by the scenario generating unit 2312 or a conversation created by a conversation generating unit 2305. A voice output unit 2307 outputs synthetic voice generated by the voice synthesis unit 2308. A character display unit 2309 displays the character in accordance with the synthetic voice outputted from the voice synthesis unit 2308. And, a control unit 2304 deals with timing for input/output of voice and display of the character and so on, and controlling various kinds of components of the information presentation apparatus.

A genre specification unit 2306 specifies a genre that the selected character belongs to, based on the character information retained in the character information retaining unit 2311. A conversation generating unit 2305 creates data of a conversation held between characters at the time of switching between genres. A conversation data unit 2310 retains conversation data for each character.

Figure 21:
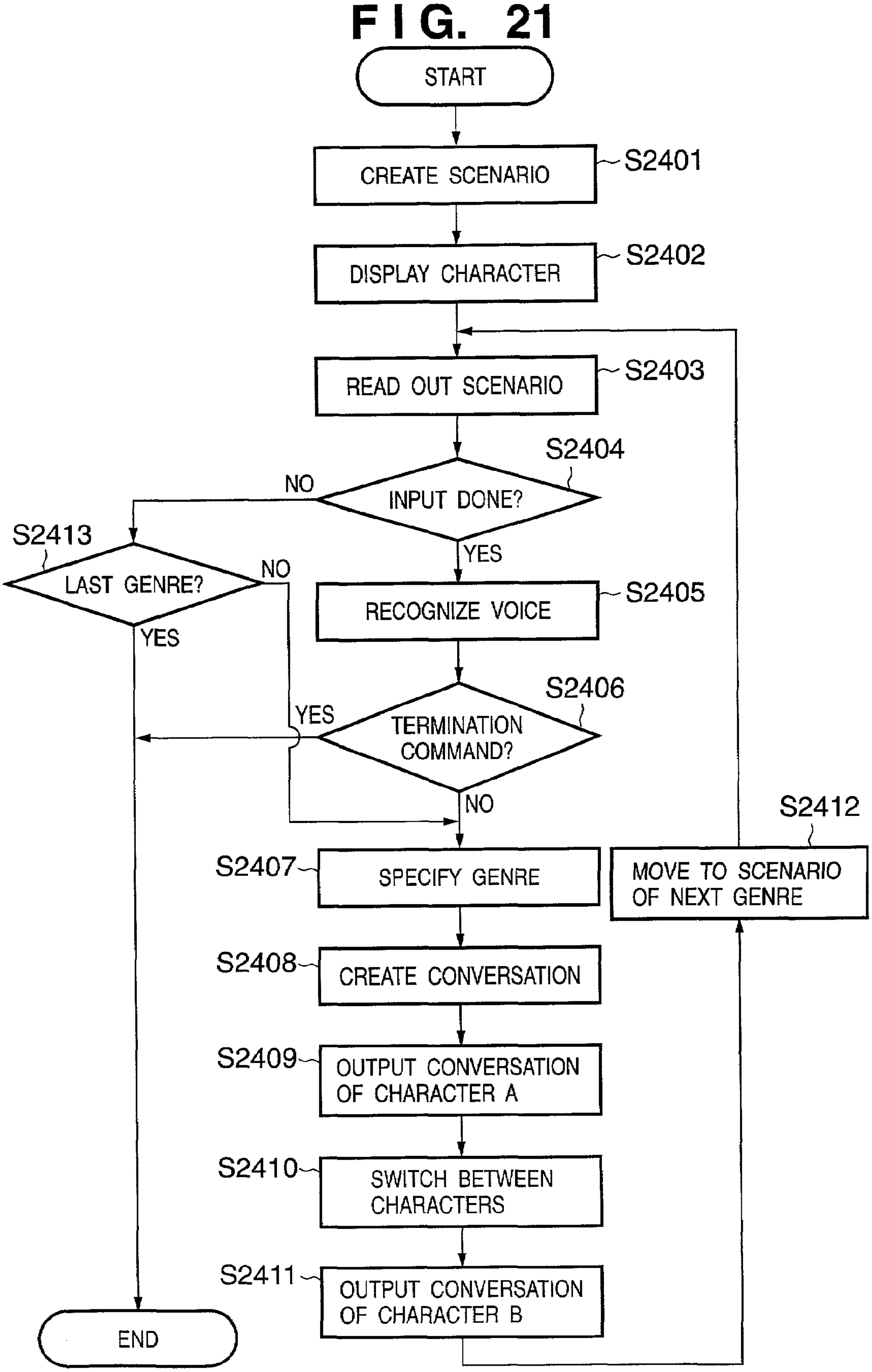
FIG. 21 is a flowchart showing a procedure for processing carried out in the information presentation apparatus of Third Embodiment of the present invention.

FIG. 21 is a flowchart showing a procedure for processing carried out by the information presentation apparatus of Third Embodiment of the present invention.

When this information presentation apparatus is started, if not specified by the user, the control unit 2304 determines at random the order of genres of which information is to be provided, and the scenario generating unit 2312 creates a scenario of the character reading out the information of the selected genre, based on the text data of the selected genre retained in the text data retaining unit 2303, and the corresponding character information retained in the character information retaining unit 2311 (step S2401).

Then, the character display unit 2309 displays a character on the screen based on the created scenario by the scenario generating unit 2312 (step S2402). After the character is displayed, the text data constituting the scenario is transformed into synthetic voice by the voice synthesis unit 2308, and is outputted by the voice output unit 2307 (step S2403).

Then, the control unit 2304 determines whether or not voice input from the user occurs during the outputting of the synthetic voice (step S2404). If the voice input does not occur (NO in step S2404), the process proceeds to step S2413 after the scenario is read out, and whether or not the scenario read out just previously belongs to the last genre is determined. If it belongs to the last genre (YES in step S2413), the process ends. On the other hand, if it does not belong to the last genre (NO in step S2413), the process proceeds to step S2407.

On the other hand, if it is determined at step S2404 that voice input occurs (YES in step S2404), the process proceeds to step S2405, where the voice recognition unit 2302 performs voice recognition. Then, whether or not the result of recognition by the voice recognition is an ending command indicating the end of the presentation of information is determined (step S2406). If it is an ending command (YES in step S2406), the process ends. On the other hand, if it is not an ending command (NO in step S2406), the process proceeds to step S2407, where the genre specification unit 2306 specifies a genre indicated according to the result of the voice recognition (step S2407).

Then, based on the conversation data of the conversation data unit 2310 corresponding to the character of the specified genre, data of a conversation held between the character of the just previous genre and the character of the specified genre at the time of switching between genres (step S2408).

Then, the created conversation data is transformed into synthetic voice by the voice synthesis unit 2308, and the conversation of the just previous character (hereinafter referred to as character A) is outputted by the voice output unit 2307 (step S2409). After the conversation of the character A is outputted, the character display unit 2309 displays the character of the next genre (hereinafter referred to as character B) (step S2410). Then, after switching to display of the character B is done, the conversation of the character B is outputted by the voice output unit 2307 (step S2411).

Then, the character display unit 2309 turns to the scenario of the next genre (step S2412), and the process returns to step S2403, where presentation of information is continued.

One example of presentation of information including a conversation between the character A and the character B at the time of switching between genres in the above described processing will be described using FIG. 22.

Figure 22:
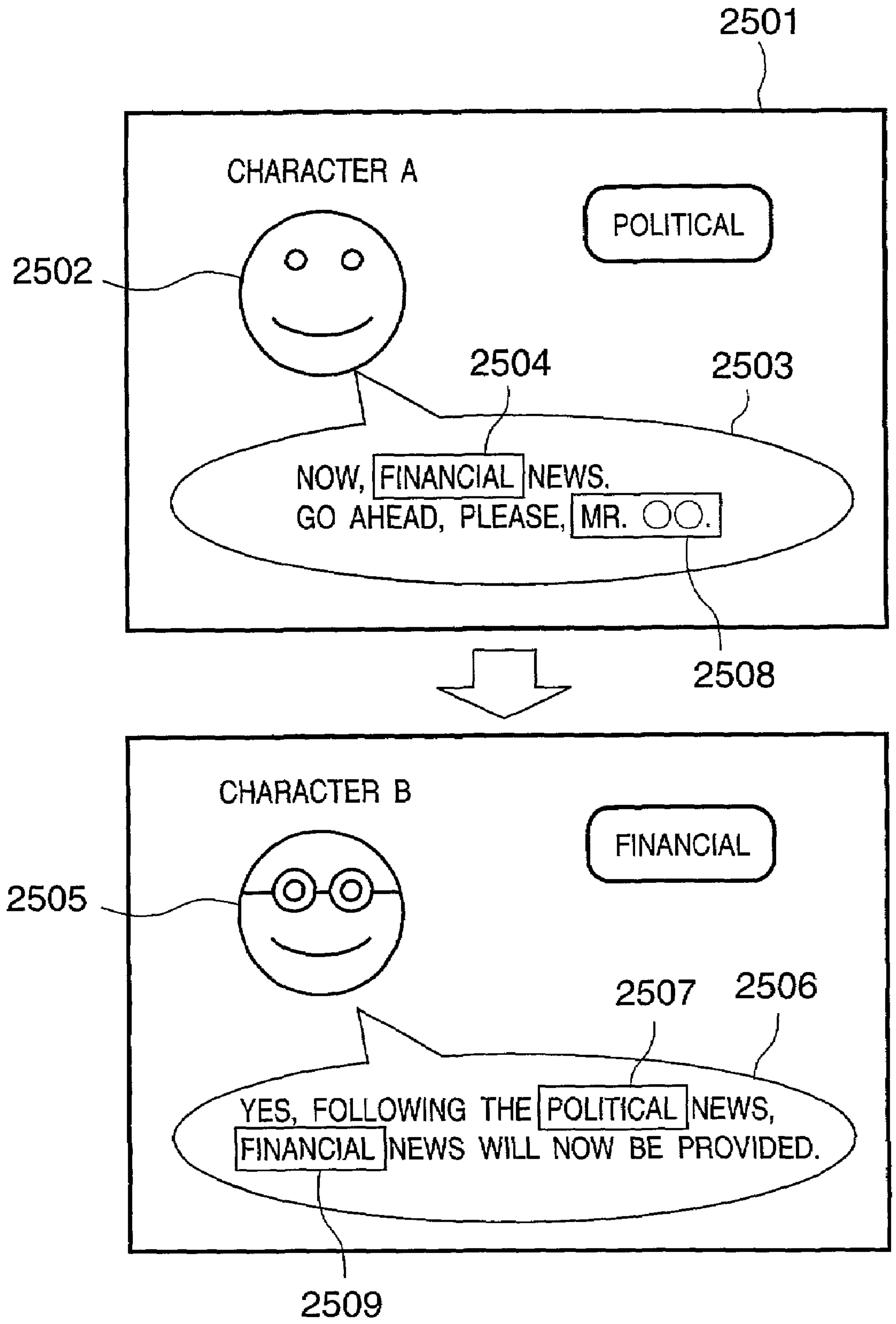
FIG. 22 shows one example of presentation of information including conversations between a character A and a character B in Third Embodiment of the present invention.

FIG. 22 shows one example of presentation of information including a conversation between the character A and the character B in Third Embodiment of the present invention.

Furthermore, in Third Embodiment, the conversation between the character A and the character B at the time of switching between genres is voice-outputted, but the letter string corresponding to this voice output may be presented on the screen together. FIG. 22 shows an example of such a case.

In FIG. 22, information is displayed on a screen 2501 of an information processing apparatus such as a personal computer operated as the information presentation apparatus. In this example, the character A belongs to a "political" genre and the character B belongs to a "financial" genre, and the example shows the case where switching is done from the "political" genre to the "financial" genre. An animation image 2502 shows the character A. An animation image 2505 shows the character B. Conversations 2503 and 2506 of the character A and character B, respectively, are made at the time of switching between genres.

When this conversation is created with the conversation generating unit 2305, letters 2504 showing the next genre (here, "political" genre), and letters 2508 showing the name of the character B (Mr. ○○) are fetched from the character information retaining unit 2311 as information of the character B, and are then embedded in a fixed sentence and transformed into synthetic voice to output words 2503 of the character A ("Now, financial news. Go ahead, please, Mr. ○○.").

Also, letters 2507 showing the previous genre (here, "political" genre) are fetched from the character information retaining unit 2311 as information of the character A, and letters 2509 showing the next genre (here, "financial" genre) are fetched form the character information retaining unit 2311 as information of the character B, and are embedded in a fixed sentence and transformed into synthetic voice to output words 2506 of the character B ("Yes. So, following the political news, financial news will now be provided.").

As described above, according to this Third Embodiment, when the character presenting information reads out completely the text in the genre corresponding to the character, or when the user gives instructions to switch between genres by voice, a conversation for takeover between the character reading out the scenario of the previous genre and the character reading out the scenario of the next genre is inserted in the process of switching between genres, thereby enabling users unfamiliar with this system to aurally recognize switching between genres more easily, in particular.

Furthermore, the present invention may be applied to a system constituted by a plurality of apparatuses (e.g. host computer, interface apparatus, reader and printer), or may be applied to equipment constituted by one apparatus (e.g. copying machine and facsimile apparatus).

Needless to say, the object of the present invention is also achieved by providing to a system or an apparatus a storage medium in which program codes of software for achieving the features of the aforesaid embodiments are recorded, and having the program codes stored in the storage medium read and executed by the computer (CPU or MPU) of the system or the apparatus.

In this case, the program code itself read from the storage medium achieves the features of the aforesaid embodiments, and the storage medium storing therein the program code constitutes the present invention.

For storage media for supplying program codes, for example a floppy disk, a hard disk, an optical memory disk, a magneto-optical disk, a CD-ROM, a CD-R, a magnetic tape, a nonvolatile memory card and a ROM may be used.

Needless to say, not only the case where the features of the aforesaid embodiments are achieved by executing the program code read by the computer, but also the case where based on instructions of the program code, the OS (operating system) or the like operating on the computer carries out a part or all of actual processing, by which the features of the aforesaid embodiments are achieved is included.

Furthermore, needless to say, the case is also included in which the program code read from the storage medium is written in a memory provided in a feature extension board inserted in the computer and a feature extension unit connected to the computer, and thereafter based on instructions of the program code, the CPU or the like provided in the feature extension board and the feature extension unit carries out a part or all of actual processing, by which the features of the aforesaid embodiments are achieved.

When the present invention is applied to the above described storage media, the program codes corresponding to the flowcharts described previously will be stored in the storage media.

As many apparently widely different embodiments of the present invention can be made without departing from the spirit and scope thereof, it is to be understood that the invention is not limited to the specific embodiments thereof except as defined in the appended claims.

What is claimed is:

1. An information presentation apparatus, comprising:

voice outputting means for carrying out voice synthesis based on text information included in send data received from a sending apparatus for sending send data including text information and a need for hiding of the text information, and outputting obtained synthetic voice; and displaying means for displaying speaker images imitating speakers of said synthetic voice and a text string to be spoken by said synthetic voice in a different text display form, which enables to distinguish each of said speaker images, corresponding to each of said speaker images, wherein said displaying means, if there is the need for hiding of the text string, displays the speaker image by placing it over the text string to hide the text string from user's view.

2. The information presentation apparatus according to claim 1, further comprising first retaining means for retaining display correspondence information showing a correspondence between each of a plurality of speaker images and the display form of a text string, wherein said displaying means displays a speaker image selected from said plurality of speaker images, and obtains a display form corresponding to said selected speaker image from said display correspondence information to display said text string in said display form.

3. The information presentation apparatus according to claim 1, further comprising second retaining means for retaining genre correspondence information showing a correspondence between said plurality of speaker images and genres, and selecting means for identifying a genre of text information included in said send data, and selecting a speaker image corresponding to the identified genre based on said genre correspondence information, wherein said displaying means displays a speaker image selected by said selecting means.

4. The information presentation apparatus according to claim 1, wherein said text display form corresponding to each of said speaker images in said displaying means is at least any one of the letter color, size and font.

5. The information presentation apparatus according to claim 1, wherein said displaying means displays said text string with a predetermined positional relation with the position in which said speaker image is displayed.

6. The information presentation apparatus according to claim 1, wherein text information included in said send data includes headline text and text of spoken contents, and said displaying means displays said headline text distinguishable from the text string.

7. An information presentation method, comprising:

a voice outputting step of carrying out voice synthesis based on text information included in send data received from a sending method for sending send data including text information and a need for hiding of the text information, and outputting obtained synthetic voice; and a displaying step of displaying speaker images imitating speakers of said synthetic voice and a text string to be spoken by said synthetic voice in a different text display form, which enables to distinguish each of said speaker images, corresponding to each of said speaker images, wherein said displaying step, if there is the need for hiding of the text string, displays the speaker image by placing it over the text string to hide the text string from user's view.

8. The information presentation method according to claim 7, further comprising a first retaining step of retaining display correspondence information showing a correspondence between each of a plurality of speaker images and the display form of a text string, wherein said displaying step displays a speaker image selected from said plurality of speaker images, and obtains a display form corresponding to said selected speaker image from said display correspondence information to display said text string in said display form.

9. The information presentation method according to claim 7, further comprising a second retaining step of retaining genre correspondence information showing a correspondence between said plurality of speaker images and genres, and a selecting step of identifying a genre of text information included in said send data, and selecting a speaker image corresponding to the identified genre based on said genre correspondence information, wherein said displaying step displays a speaker image selected in said selecting step.

10. The information presentation method according to claim 7, wherein said text display form corresponding to each of said speaker images in said displaying step is at least any one of the letter color, size and font.

11. The information presentation method according to claim 7, wherein said displaying step displays said text string with a predetermined positional relation with the position in which said speaker image is displayed.

12. The information presentation method according to claim 7, wherein text information included in said send data includes headline text and text of spoken contents, and said displaying step displays said headline text distinguishable from the text string.

13. A computer readable medium having encoded thereon a program for controlling an information presentation apparatus, comprising:

a program code of a voice outputting step of carrying out voice synthesis based on text information included in send data received from a sending method for sending send data including text information and a need for hiding of the text information, and outputting obtained synthetic voice; and a program code of a displaying step of displaying speaker images imitating speakers of said synthetic voice and a text string to be spoken by said synthetic voice in a different text display form, which enables to distinguish each of said speaker images, corresponding to each of said speaker images, wherein said displaying step, if there is the need for hiding of the text string, displays the speaker image by placing it over the text string to hide the text string from user's view.

* * * * *